Oct. 19, 1937.   T. M. DUDGEON   2,096,228
CLEANSING MACHINE
Filed May 20, 1936   2 Sheets-Sheet 1

THOMAS M. DUDGEON
INVENTOR.

BY Louis Illmer
ATTORNEY.

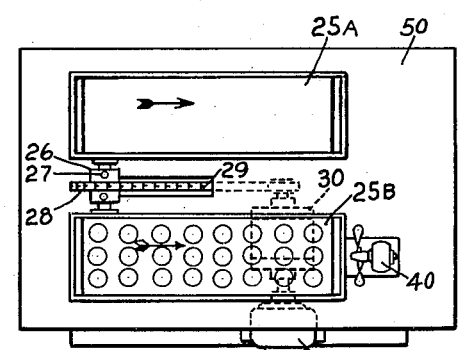
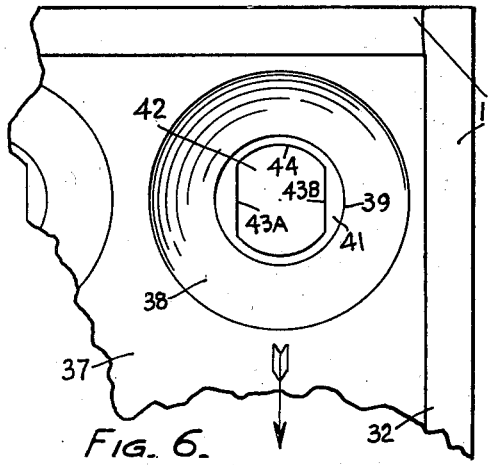
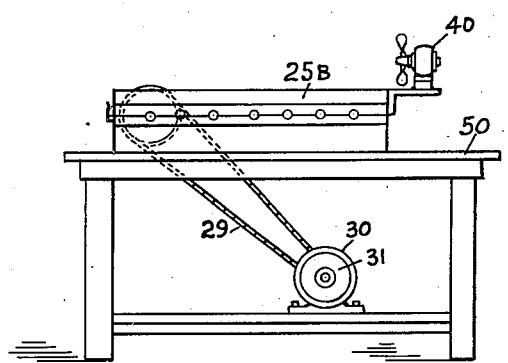
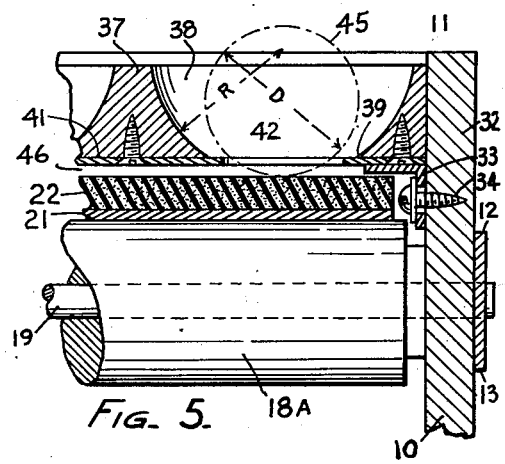
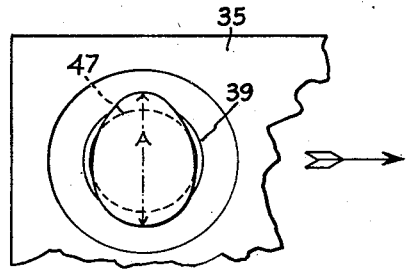
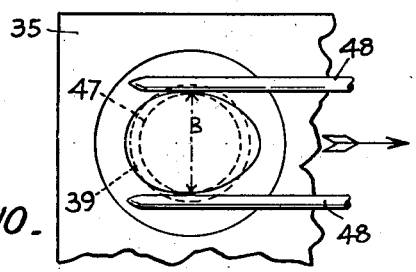

Patented Oct. 19, 1937

2,096,228

UNITED STATES PATENT OFFICE 2,096,228

CLEANSING MACHINE

Thomas M. Dudgeon, Homer, N. Y.; Ida M. Dudgeon and Walter Ross Dudgeon, administrators for said Thomas M. Dudgeon, deceased, assignors to Ida M. Dudgeon Application May 20, 1936, Serial No. 80,664

16 Claims. (Cl. 146—198)

The present invention relates to an automatic egg or ball cleanser that is especially suited to the treating of hen's eggs or the like spheroid articles with the intent to deterge the whole of each such oval surface by the use of an underlying relatively flat endless wiping belt or the equivalent horizontally driven brushing agency. One or more eggs are rotatably supported thereon in such fashion that my continuously moving belt tangentially contacts and thereby individually drags each egg shell successively around both its minor and its major axes to effectively tumble and thereby bring all surface regions thereof including the opposite ends into active wiping engagement with such cleansing belt, but without subjecting the treated egg to a centrifugal or the like disturbing impulsive force that might lead to abnormal shell cracking.

To attain this objective, I preferably provide for each such egg or similar article, a separate chambered or the like upturned bowl-shaped pocket means having a central aperture through the bottom thereof and which aperture is disposed directly over said belt. The respective lower regions of a row of treated eggs are herein made to floatingly ride upon a common belt and are simultaneously rotated thereby, the intent being to deliver eggs in a clean marketable condition free from specks or hennery defilement prior to being crated for shipment. By virtue of my improvements, such egg cleansing operations may be carried on continuously without being shut down, thereby saving both time and labor over having to individually wash and wipe each egg by hand.

Eggs in containers coming from a large hennery are usually first candled and graded as to size. To facilitate the further handling and cleansing of such eggs in groups at a rapid productive rate, my machine is served by demountable carrier trays respectively having one or more smoothly bored pockets sunk therein whose profile shape may be similar to that of a spherical zone or frustum. A separate uncleaned egg is supportingly seated into each such apertured pocket prior to superimposing the loaded trays upon the moving belt of my machine. Said open mouthed tray pockets are herein made considerably larger in diametral size than the major axis of the treated egg and preferably kept devoid of all resilient guide prongs, cushioned bars or the like interferences against which an egg is likely to impinge or drag when actuated during its cleansing treatment.

After completing such tumbling treatment, the group of eggs comprised in any one such portable tray may be removed bodily from this cleansing machine. Hence, the eggs while at rest may be unobstructedly and safely picked up out of their respective pockets for crating, which distinctive feature further obviates abnormal shell breakage. If inadvertently, a cracked egg should break open during its treatment, the exposed belt surface of my machine can readily be wiped free of such spill without need of any shut down or general overhauling.

As regards the structural aspects of my carrier tray, each pocket thereof may be sheathed with a metallic sole plate having a centralized aperture therethrough of which the perimeter is kept smaller than the corresponding egg size. The egg initially spans the sole plate aperture without falling therethrough but said aperture is made sufficiently large to allow the bottom portion of each suspended egg to project beneath the level of said sole plate into a lowermost drop position.

Such loaded trays may thereupon be transferred to my machine, which latter is in turn equipped with a pair of suitably spaced runners or rectilinear guideways along which the respective trays may be shifted in tandem. My driven endless belt is mounted lengthwise between said guideways with its upturned wiping face located closely adjacent to the downwardly projecting surface portions of the nested eggs that are sustained over the belt by the carrier trays, the apertured sole plate being interferingly interposed between the wiper agency and each treated egg. When the tray is placed in operative position, the several eggs are floatingly lifted off their respective sole plates and raised out of the aforesaid drop position, to the end that a group of pocketed eggs will frictionally ride upon my moving cleansing belt and thereby separately rotate each egg. By virtue of my improved arrangement, each shell is purposely upheld in a centralized pivotal contact region with respect to such common belt. Because of its inherently soft and pliable nature, said belt conforms somewhat to the elliptical profile of an egg so as to enlarge the tangential contact therebetween, but each actuated egg is still permitted to indiscriminately tilt axially and freely roll in any direction about its own single pivotal support when my belt travels tangentially with respect to said centralized contact.

As a result, a diverse rotary movement is imparted to each such machine treated egg that causes the respective eggs to climb gently upward to some extent upon its pocket side wall while maintaining the aforesaid centralized operative contact with the belt or brushing agency. By virtue of certain tilt controls, each treated egg is made to tumble or otherwise roll over in a capricious manner about first one and then the other of its axes so as to bring about a rapid and thorough deterging of the whole egg surface.

In so far as the major portion of the superficial area of an egg lies contiguous to its swelled belly, I have purposely so devised the flared wall shape of each tray pocket that such belly region will predominantly gravitate toward and thereby tend to contact said belt during most of the treatment time. The controlled pocket is so shaped however, that the opposed egg tips will also be appropriately treated by the belt but for a proportionately shorter time period that shall be approximately commensurate with the lesser shell surface thereof. In this manner, the entire egg surface may be uniformly cleansed to the best advantage at the maximum productive rate without having to delay the completion of such process because of failure to expeditiously reach and cleanse some particular surface region. A characteristic of the present improvements resides in so disposing my cleansing apparatus that the minor axis or egg belly will tend to frequently drop into riding contact with the cleansing belt while at the same time providing for an egg turnover in opposite directions about the minor axis that will adequately reach but not persistently treat the tip ends of such egg.

My cleansing machine is preferably equipped with two similar sections, each provided with separate belt means that are positively driven in unison from a common motor to constitute a continuous two stage egg processing apparatus. One such section may be provided with a moistening medium which applies a slight degree of dampness to the upper belt surface thereof so that any except abnormally dirty surface deposits upon the treated egg, will be promptly loosened without allowing the shell to become permeated with moisture. The companion section of my machine may be used as a drier unit and as such provided with a fan or the like forced ventilating means which blows dry air over any exposed belt surface and also over the row of its actuated eggs to evaporate all surplus moisture that may be carried along therewith. My moving belt slowly shifts the trays thereon in the direction of belt travel and by the time any one advancing egg traverses the full length of such drier section, the cleansed shell thereof will have become substantially dry. Water saturated shells are found objectionable when used for storage or setting purposes.

The primary object of the present invention is to devise an inherently simple and effective cleansing apparatus of the character indicated that can be marketed at a reasonably low installation cost and one that shall be easy to operate successfully by an unskilled attendant at a relatively rapid rate of production without danger of excessive shell breakage and in which the handling of egg-shaped or the like articles is materially facilitated by the use of serving trays that respectively provide for at least one open mouthed pocket in which to unrestrainedly lodge and superficially treat such article without persistently rotating the same about a single axis. Embodied herein are also structural aspects designed to promote the end in view and all of which design features will hereinafter be more explicitly set forth.

Reference is had to the accompanying two sheets of drawings which are illustrative of a certain preferred embodiment of my devices, and in which drawings:

Fig. 1 shows a top or plan view of one section of my cleansing machine, and Fig. 2 is a side elevation thereof.

Figs. 3 and 4 respectively represent cross-sectional views taken along lines 3—3 and 4—4 of Fig. 1.

Fig. 5 is an enlarged assembly detail taken along 5—5 of Fig. 1 to depict my endless belt having a loaded tray operatively superimposed thereon, while Fig. 6 shows a fragmental top view of such unloaded tray.

Figs. 7 and 8 represent different assembly views of my two stage units as driven in unison and mounted upon a common stand.

Figs. 9 and 10 schematically illustrate the principle underlying my cleansing machine.

Figure 2:
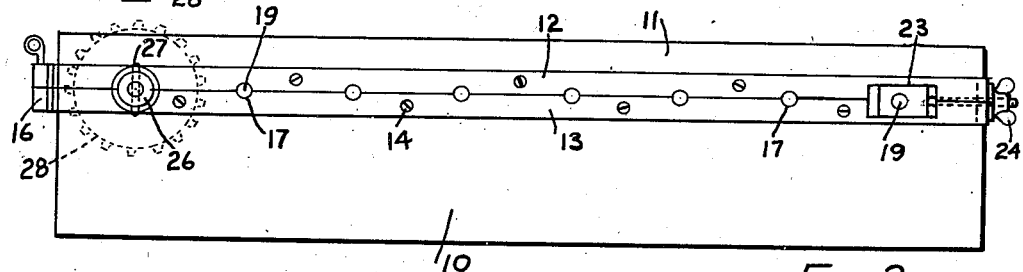
Figure 3:
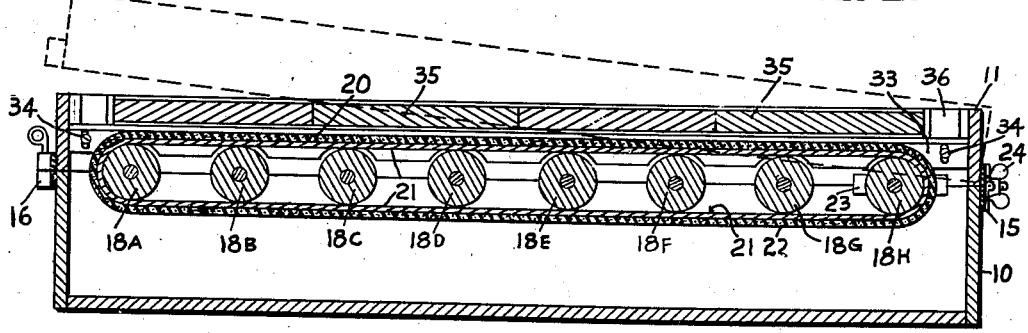

Referring now in detail to the drawings, a split elongated section for housing my driven belt may comprise a wooden lower boxlike casing 10 of which the flush upturned edges of its side walls have a demountable skeleton framework 11 of the open top type superimposed thereon. The respective parting edges of such split section are shown reenforced by separate metallic trim straps such as 12 and 13 that may be fixedly attached in edgewise registry by screws 14 as in Fig. 2. One transverse end of said casing may have the framework 11 attached thereto by the hinges 15 while its opposite end is shown secured by the latch 16.

The longitudinal abutting edges of the straps 13 and 14 may respectively be recessed to provide for a series of horizontally split bearings such as 17 disposed along each side wall of my casing as shown. Mounted across each axially aligned pair of bearings is a roller 18A, 18B, etc. respectively having an axle 19 therethrough. These several rollers are operatively embraced by an endless two ply wiper belt 20 of which the inner facing is preferably fabricated as a relatively thin backing layer or ply 21 and which inherently strong and non-stretchable reenforcement has cemented to the outer surface thereof, a thick coating or ply of soft sponge rubber or the like resilient cushioning medium 22. The backing ply grips the end rollers and may be snugly stretched thereover by belt tightener means such as the slide blocks 23 that adjustably tension this endless belt by means of the wing nuts 24. When in place, the top of my wiper belt preferably lies horizontal and a sufficient number of intermediate idler rollers are provided to sustain its upturned face in a substantially level condition throughout its length so as to be free from undue linear sag. If desired, said belt might also be cross-sectionally dished when a similar followup shape is given to the carrier tray. In order to replace the endless belt or any roller thereof, the latch 16 is released and the framework tilted about the hinges 15.

As will be understood from Figs. 7 and 8, my machine preferably comprises two sections such as 25A and 25B that are similarly equipped with drive belts. The numeral 40 represents an air fan or blower unit. As shown, said sections are here placed alongside each other upon a common table or stand such as 50 with the corresponding axles coupled together by a sleeve 26 that may be fastened to the interconnected axles by dowel pins such as 27. A sleeve sprocket 28 may be positively driven by a chain 29 from a suitable speed reducing mechanism 30, preferably of the adjustable gear ratio so as to maintain the belt travel at a predetermined rate of around 50 feet per minute in a common direction as indicated by arrows. A small high speed electric motor 31 may serve as a power source for such reducer although it will be obvious that such mechanism may likewise be manually operated. The elimination of slip between the motor and the driven roller 18A makes for a uniform belt speed that does not tend to pound the treated eggs or tumble them too fast for effective cleansing. It will be obvious that my complementary sections 25A and 25B may also be disposed in tandem and that my wiper belt may likewise be arranged for manual drive.

Figure 4:
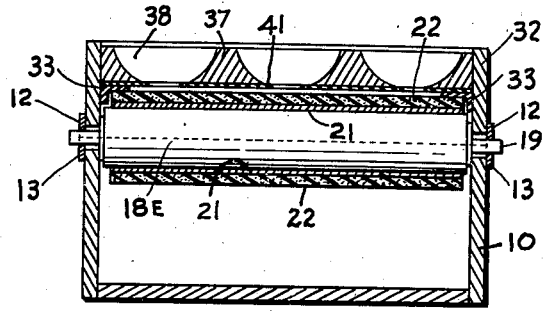

As detailed in Figs. 4 and 5, opposite slats 32 of my framework may respectively be provided with a longitudinal guideway such as 33. Each such stationary guide may be made up as a relatively thin, angle shaped rail having one leg thereof vertically slotted and secured in place by adjusting screws such as 34, while the other leg is freely inturned over the top face of the movable belt 20.

Figure 1:
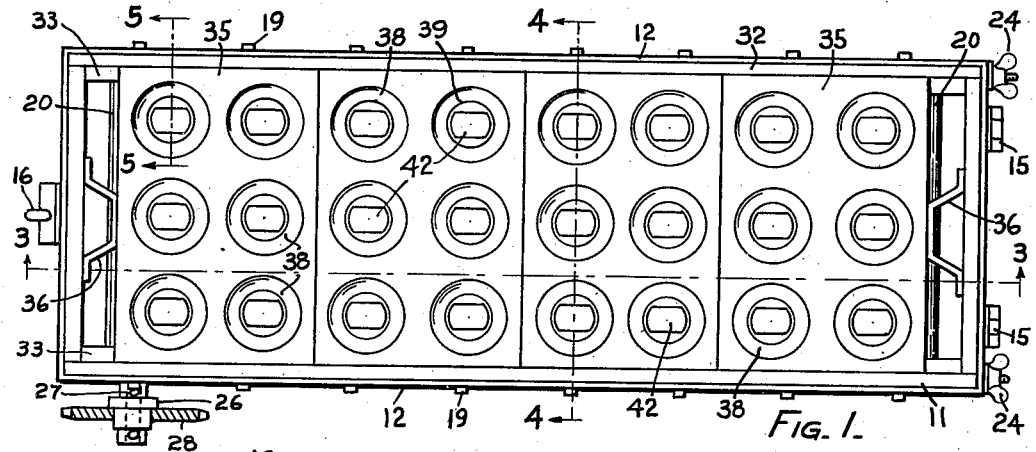

One or more carrier trays such as 35, are inset within the framework slats and are slidably suspended to rest upon the inturned faces of said guideways. By raising or lowering the rails, the parallel spacing 46 between the bottom of the several trays and top of said belt may be accurately adjusted to suit requirements. As shown in Fig. 1, it is preferred to operate a plurality of such demountable trays in conjunction with a common wiper belt. Newly loaded trays are fed onto one section end and these are slowly advanced to the other end thereof at a travel rate less than that of the belt because of egg rotation and slippage. The delivered trays are then removed bodily, the length of my guideways being so proportioned that all the eggs will have been thoroughly cleansed in a single pass. A stop bracket 36 serves to space an end tray from the transverse frame slats for such manipulation and in which terminal position the tray is automatically brought to rest while the driven belt is allowed to continue its regular movement.

Figs. 5 and 6 reveal the preferred mode of shaping up the multiple open mouthed or bowl-shaped pockets in each such tray. The tray block proper (designated 37) may be fabricated from relatively soft, non-metallic material such as high grade cypress wood or the like. A boring tool having a cutting radius R, may be resorted to in forming some half dozen pockets in each such tray and thus cutting out a spherical frustumlike chamber shape marked 38. The cutter radius R is kept materially larger in size than one-half of the minor egg diameter D so as to afford adequate freedom of movement when turning over a treated egg about either of its axes; that is to say, the radius of such pocket curvature is greater than that corresponding to any profile portion of the egg nested therein. The inner perimeter of each bored pocket forms a contracted hole 39 that is defined by a knife edge profile. The corresponding side wall of each pocket flares outwardly therefrom and assumes a relatively sharp profile incline toward its upturned open mouth. In addition, I may provide for a relatively thin metallic sheath or sole plate 41 fixedly attached beneath said block.

This plate is preferably made of sheet copper or any material not likely to discolor or otherwise leave a mark on a treated white egg. Said sole plate has an aperture 42 therethrough for each such pocket with the perimeter symmetrically disposed around the pocket axis. For reasons that will appear presently, it is preferred to elongate said plate aperture so as to provide for a pair of substantially parallel marginal control or egg guide edges such as 43A and 43B disposed in alignment with the direction of belt movement. It will be observed that the respective aperture guide edges of the several pockets comprised in each tray, are all disposed to lie in one and the same direction. The perimeter of the sole plate aperture may be completed by opposed arcuate edges such as 44 which may be radially inset somewhat with respect to the contracted pocket diameter 39.

In Fig. 5, the dotted circle 45 represents the smaller contour of an egg operatively placed in one such tray pocket. It will be observed that the spacing between the plate edges 43A and 43B is kept smaller than the minor diametral dimension D of the treated egg so that each tray may be loaded without allowing the eggs to fall therethrough. If the carrier tray 35 together with its sole plate were to be lifted off its supporting guideways 33, the egg circle 45 would drop slightly into a lowermost position when brought into bridging engagement with said edges 43A and 43B and thereby augment its floating projection that normally extends beneath the sole plate while the egg is being operatively wiped by the belt. By maintaining the tray clearance space 46 in proper adjustment, the treated egg by its own weight, is made to ride upon the belt in a centralized contact region, irrespective of whether the major axis of the egg lies crosswise or lengthwise of the guideways. As a result, the cushioned belt 20 will impart a rotating movement to the egg while being cleansed. When my tray is operatively placed upon its guides, all eggs contained therein are automatically lifted into floating position. The use of the exposed inwardly projecting metallic edges 43A and 43B serve to reduce frictional drag to a minimum should an egg rub thereagainst and hence facilitates the maintained tumbling of a wiped egg without abnormal counterdrag.

The means whereby all surface portions of the egg are indiscriminately brought into successive contact with the top face of my wiping agency 20, may be clarified by reference to Figs. 9 and 10. The arrows represent the direction of belt travel and the dotted sole plate aperture 47 is here provisionally made round of a size substantially equal to that of the contracted pocket diameter or hole 39.

When treated as herein contemplated, the egg naturally gravitates and tends to rotate about its major axis A in the Fig. 9 fashion; in the absence of an elongated sole plate aperture, it would continue such performance. However, it has been found that by appropriately introducing a rod or the like control 48 into such pocket, the driven egg will immediately start to rotate in a different relationship. If for instance, one or more such tilted guide rods were placed in a pocket as in Fig. 10, the belt driven egg will now rotate continuously about its minor axis B, instead of its major axis as in Fig. 9. Such rod obstruction is however, objectionable in that it interferes with the free egg movement in other directions and also with the easy egg replacement to and from a pocket.

I have experimentally determined that the virtual equivalent of the guide rods 48 may be attained by shaping up the sole plate aperture 42 with the defined complementary guide or control edges 43A and 43B arranged parallel to the direction of belt movement. Such disposition not only obviates pocket interference but offers a further advantage in that the aperture 42 can be shaped to set up a predominating rotation of the egg about its major axis A while still bringing about an adequate rotation about the minor axis B together with certain intermediate axial positions. As a result, a prompt and uniform cleansing of the entire egg surface may be effected in the manner previously defined.

In practice, the egg is found to axially shift continuously and even to reverse its direction of rotation from time to time so as to effectively reach and wipe all superficial shell portions in a substantially like degree. It is preferred to grade the eggs into several sizes before starting the treatment thereof and to provide corresponding pockets together with suitable sole plate apertures cooperatively shaped to expeditiously handle each such grade. By virtue of the described instrumentalities I am enabled to rapidly clean the whole of such egg surfaces without involving delay because of a persistence in cleansing only some particular surface portion thereof.

Referring further to the two stage sections of Fig. 7, the exterior belt face of the first unit 25A may be slightly moistened by a sponge upon removing one of the carrier trays or by other appropriate distributed drip means (not shown). The belt of my second section 25B is not moistened but purposely kept dry. After the eggs have been properly wiped by said moistened belt and their respective trays reach the end of the first stage line, such trays and eggs are bodily transferred to the other section 25B, starting inwardly toward the fan 40 so as to come under the drying influence thereof, and finally deliver the treated eggs in a substantially dry condition at the fan end of the second stage section of my machine. As soon as one end tray is removed, the frictional belt engagement with the eggs is sufficient to slowly drag the several trays onward to close such gap and thus provide room at the opposite section end for the reception of a reloaded tray.

While a particular shape of sole plate aperture is preferred, it is within the scope of my invention to resort to any apertured pocket shape cooperating with or without guide rods and disposed to allow the egg to ride upon an underlying moving belt so that the flared pocket side walls will serve to tangentially shift the egg into diverse belt contacting positions. It will be obvious that my trays may be designed as permanent machine fixtures whereupon eggs, balls or the like articles might be dropped into and removed from equivalent pockets without necessarily being bodily removable with such tray, also that both such tray and the belt may be similarly dished in spaced relationship and still bring about the herein contemplated cleansing results. It is believed the preceding disclosure makes apparent to those skilled in this art, the advantages afforded by my improved cleansing machine, it being understood that various equivalent changes in its illustrative embodiment may be resorted to, all without departing from the spirit and scope of my invention heretofore described and more particularly pointed out in the appended claims.

I claim:

1. A cleansing machine comprising movably mounted brushing means having an upturned wiper face, tray means mounted over said face in laterally spaced relationship and provided with a sunken bowl-like pocket adapted to superficially treat an egg-shaped article therein and the open mouth of which pocket is substantially circular having a diametral dimension materially longer than the major axis of said article to permit of freely tumbling the article about either of its axes, said pocket having an aperture in the bottom region thereof toward which the article gravitates and projects therethrough into a lowermost drop position, the aforesaid lateral spacing being restricted to allow the article projection to engage the wiper face in centralized pivotal contact and thereby floatingly raise the article above the lowermost drop position, and drive means dragging said brushing means tangentially with respect to said centralized contact.

2. A cleansing machine comprising movably mounted brushing means having an upturned wiper face, tray means superimposed over said face in laterally spaced relationship and which tray is provided with a row of sunken bowl-like pockets respectively adapted to superficially treat a separate egg-shaped article therein and the open mouths of which pockets respectively have a diametral dimension materially longer than the major axis of the article treated therein to permit of freely tumbling such article about either of its axes, each such pocket having an aperture in the bottom region thereof toward which the article therein gravitates and projects therethrough into its lowermost drop position, the aforesaid spacing being such as to allow the respective article projections to engage said wiper face and thereby floatingly elevate the several articles above their respective lowermost drop positions, and drive means dragging the brush means lengthwise of said pockets to rotate the several articles in unison.

3. A cleansing machine comprising movably mounted brushing means including an upturned wiper face, tray means superimposed in laterally spaced relation over the wiper face, said means being provided with a relatively thick block member having a bowl-like pocket sunk into its upper surface adapted to receive an egg-shaped article therein and which pocket has a hole in the bottom region thereof of which the perimeter is contracted with respect to the pocket mouth, said tray being further provided with relatively thin sole plate means secured to the bottom surface of the block and having an aperture therethrough of which the major portion of its perimeter is radially inset with respect to the perimeter of the block hole and toward which aperture the article tends to gravitate and project downwardly therethrough into floating engagement with said wiper face, and drive means advancing the brushing means while maintaining the aforesaid floating engagement, the open mouth of said pocket having a diametral size materially larger than the major axis of the article and which advancing brushing means serves to successively rotate said article about both of its axes.

4. A cleansing machine comprising a driven endless belt having an upturned wiper face, and tray means superimposed in laterally spaced relation over the wiper face, said means including a block member provided with a chambered pocket of spheroidal frustumlike profile sunk into the upper block surface adapted to receive a spheroidal article whose radius of curvature is smaller than that of said profile, the bottom surface of the block being equipped with sole plate means having an aperture therethrough whose perimeter is less than the corresponding maximum size of the article and which article is allowed to gravitate into operative contact with the driven belt through said aperture, said belt serving to indiscriminately tumble the article about different axes thereof.

5. An egg cleansing machine comprising driven brush means including an elongated upturned wiper face mounted to advance lengthwise, plate-like tray means superimposed flatwise over the wiper face and which tray is provided with an open mouthed egg receiving pocket sunk in its upper surface that has a minimum diametral mouth dimension longer than the major axis of the received egg, said pocket having an aperture in the bottom region thereof toward which the egg gravitates and projects therethrough into pivotal contact with the underlying wiper face and which egg is thereby rotated about its major axis, and egg guide means directed lengthwise of said wiper face and serving to shift such rotation about the minor axis of said egg.

6. A cleansing machine comprising movably mounted brushing means having an elongated upturned wiper face, drive means advancing said face lengthwise, tray means superimposed over the wiper face in laterally spaced relationship and which tray has a downwardly converging pocket-like chamber sunk therethrough of which the chamber wall defines a contracted hole located at the bottom surface of said tray, and sole plate means adjoined to said bottom surface, said sole plate means having an aperture therethrough of which the perimeter is shaped to include oppositely disposed rectilinear edges directed lengthwise of the wiper face and which edges are located within the perimetric confines of the contracted hole.

7. A cleansing machine comprising a driven endless belt including a horizontal length component provided with a relatively flat upturned wiper face, complementary guideway means respectively disposed contiguous to opposite edges of said belt component, a demountable carrier tray superimposed to span said guideways and which tray is provided with a plurality of bowl-like pockets respectively adapted to superficially treat a separate egg-shaped article therein and the open mouths of which pockets respectively have a diametral dimension materially longer than the major axis of the article treated therein to permit of freely tumbling such article about either of its axes, the bottom region of each such pocket being apertured to a size that will supportingly retain but allow the article thereof to project downwardly therethrough into operative wiping contact with the aforesaid face, said tray when removed from the guideways serving to bodily carry the several articles therewith.

8. An egg cleansing machine comprising a driven belt including a length component provided with a relatively flat upturned wiper face, means driving said belt component lengthwise, guideway means disposed lengthwise of the belt component, and a demountable carrier tray upheld by said guideway means to extend over the wiper face and the upper surface of which tray has a plurality of bowl-shaped egg receiving pockets sunk therein, each such pocket being circumscribed by a downwardly converging wall having a contracted marginal edge including a rectilinear edge component extending lengthwise of the driven belt component and which marginal edge defines an aperture through which a received egg gravitates into contact with the underlying wiper face, the respective upturned mouths of said pockets being of a diametral size larger than the major axis of the egg received therein and permitting of freely tumbling the several eggs in unison without a persistent turning about some particular axis thereof.

9. A cleansing machine comprising housing means having a series of rollers mounted thereon in horizontal parallelism, a two-ply endless wiper belt operatively embracing all such rollers of which the inner backing ply is kept relatively thin and non-stretchable and has a relatively thick resilient ply superimposed thereon to constitute a cushioning medium including an upturned wiping face, and tray means mounted over said face in laterally spaced relationship and provided with a sunken open mouthed pocket adapted to superficially treat the whole of an egg-shaped article therein, said pocket having an aperture in the bottom region thereof toward which the article gravitates into tangential contact with said wiping face, the confining walls of said pocket being flared outwardly and upwardly from the perimeter of such aperture to permit of diverse tumbling of the article about either of its axes.

10. A cleansing machine comprising companion sections, each provided with driven brushing means including an upturned wiping face of which one such is moistened and the other is kept dry, separate guideway means associated with each such section, and common transferable tray means arranged to be carried upon either guideway means, said tray means being provided with an open mouthed pocket adapted to supportingly seat a spheroidal article therein and which pocket has an aperture in the bottom region thereof of which the perimeter assumes a closely spaced relation with respect to either wiper face when the tray is transferred from one to the other of said guideways and in either instance floatingly lifts said seated article.

11. A cleansing machine comprising companion sections, each provided with driven brushing means including an upturned wiping face of which one such is moistened and the other is kept dry, separate guideway means associated with each such section, common transferable tray means arranged to be carried upon either guideway means, said tray means being provided with an open mouthed pocket adapted to supportingly seat a spheroidal article therein and which pocket has an aperture in the bottom region thereof of which the perimeter asumes a closely spaced relation with respect to either wiper face when the tray is transfered from one to the other of said guideways and in either instance floatingly lifts said seated article, and drier means operatively associated with one such section serving to dehydrate the surface of said article after being moistened.

12. A cleansing machine comprising companion sections, each provided with driven brushing means including an upturned wiping face of which one such is moistened and the other is kept dry, separate guideway means associated with each such section, common transferable tray means arranged to be carried upon either guideway means, said tray means being provided with an open mouthed pocket adapted to supportingly seat a spheroidal article therein and which pocket has an aperture in the bottom region thereof of which the perimeter assumes a closely spaced relation with respect to either wiper face when the tray is transferred from one to the other of said guideways and in either instance floatingly lifts said seated article, and motive means driving the respective brushing means in unison.

13. A cleansing machine comprising housing sidewalls having an endless belt mounted therebetween and which belt includes an upturned wiper face, means for driving the belt lengthwise, complementary guideway means respectively located alongside opposite longitudinal edges of said belt, said guideways including cross-sectionally angle shaped members of which one leg is shiftably attached to a contiguous sidewall and the other leg is spacedly inturned over said wiper face, adjusting means for altering the spacing between said inturned legs and said face, and tray means arranged to span the respective inturned legs, said tray being provided with a sunken pocket adapted to support a spheroidal article therein and which pocket has an aperture in the bottom region thereof allowing the article to gravitate into wiping contact with the wiper face therebeneath.

14. A machine for cleansing spheroidal articles and which machine comprises a movably mounted endless belt including a length component provided with a relatively flat upturned wiper face, means for moving the belt longitudinally, guideway means disposed lengthwise of said face, and a demountable carrier tray upheld by the guideway means and extending over the wiper face in a restricted laterally spaced relationship and which tray is provided with a plurality of sunken article receiving pockets each having a bottom aperture therethrough toward which a pocketed article gravitates into floating pivotal contact with the underlying wiper face, the aforesaid lateral spacing being sufficiently restricted to simultaneously lift all of the pocketed articles by virtue of their respective pivotal contacts and which belt serves to frictionally drag the tray in a like direction lengthwise of the guideway means at a rate of travel slower than that imparted to the belt.

15. A machine for cleansing spheroidal articles and which machine comprises a movably mounted endless belt including a length component provided with a relatively flat upturned wiper face, means for moving the belt longitudinally, guideway means disposed lengthwise of said face, a demountable carrier tray upheld by the guideway means and extending over the wiper face in a restricted laterally spaced relationship and which tray is provided with a plurality of sunken article receiving pockets each having a bottom aperture therethrough toward which a pocketed article gravitates into floating pivotal contact with the underlying wiper face, the aforesaid lateral spacing being sufficiently restricted to simultaneously lift all of the pocketed articles by virtue of their respective pivotal contacts and which belt serves to frictionally drag the tray in a like direction lengthwise of the guideway means at a rate of travel slower than that imparted to the belt, and stop means automatically bringing the tray to rest while the belt continues to move onward.

16. A machine for cleansing egg-shaped articles and which machine comprises a movably mounted endless belt including a length component provided with a relatively flat upturned wiper face, and a carrier tray extending over the wiper face in restricted laterally spaced relationship and provided with a sunken bowl-shaped pocket adapted to superficially treat an article therein, the bottom of said pocket having an aperture therethrough toward which the article gravitates into floating pivotal contact with the underlying wiper face and the upturned mouth of said pocket being materially larger in diametral size than the length of the major axis of the article to permit the article to unobstructedly tilt axially about its pivotal contact in any direction within the pocket confines.

THOMAS M. DUDGEON.